United States Patent [19]

Burdick

[11] 3,820,467

[45] June 28, 1974

[54] CONVEYOR SYSTEM WITH AIR IN FLOOR

[75] Inventor: Robert E. Burdick, Santa Barbara, Calif.

[73] Assignee: Rolair Systems, Inc., Santa Barbara, Calif.

[22] Filed: Oct. 18, 1972

[21] Appl. No.: 298,465

[52] U.S. Cl. ............ 104/23 FS, 104/134, 214/1 BE
[51] Int. Cl. ............................................ B61b 13/00
[58] Field of Search ......... 104/23 FS, 134; 140/117, 140/120, 121, 122; 214/1 BE

[56] References Cited
UNITED STATES PATENTS

| | | |
|---|---|---|
| 3,443,838 | 5/1969 | Jung ................................ 214/1 BE |
| 3,511,330 | 5/1970 | Livesay .............................. 180/122 |
| 3,513,934 | 5/1970 | Crowley .......................... 104/23 FS |
| 3,540,378 | 11/1970 | Giraud ............................. 104/23 FS |
| 3,698,506 | 10/1972 | Croix-Marie .................... 104/23 FS |

Primary Examiner—M. Henson Wood, Jr.
Assistant Examiner—D. W. Keen
Attorney, Agent, or Firm—Harris, Kern, Wallen & Tinsley

[57] ABSTRACT

An air cushion conveyor system for an assembly line or the like. A track for a plurality of transporters, each supported on air bearings, with air supply ducts for the bearings in the track. Track manufactured in sections for assembly on the site, and incorporating air ducts and transporter drive units.

9 Claims, 9 Drawing Figures

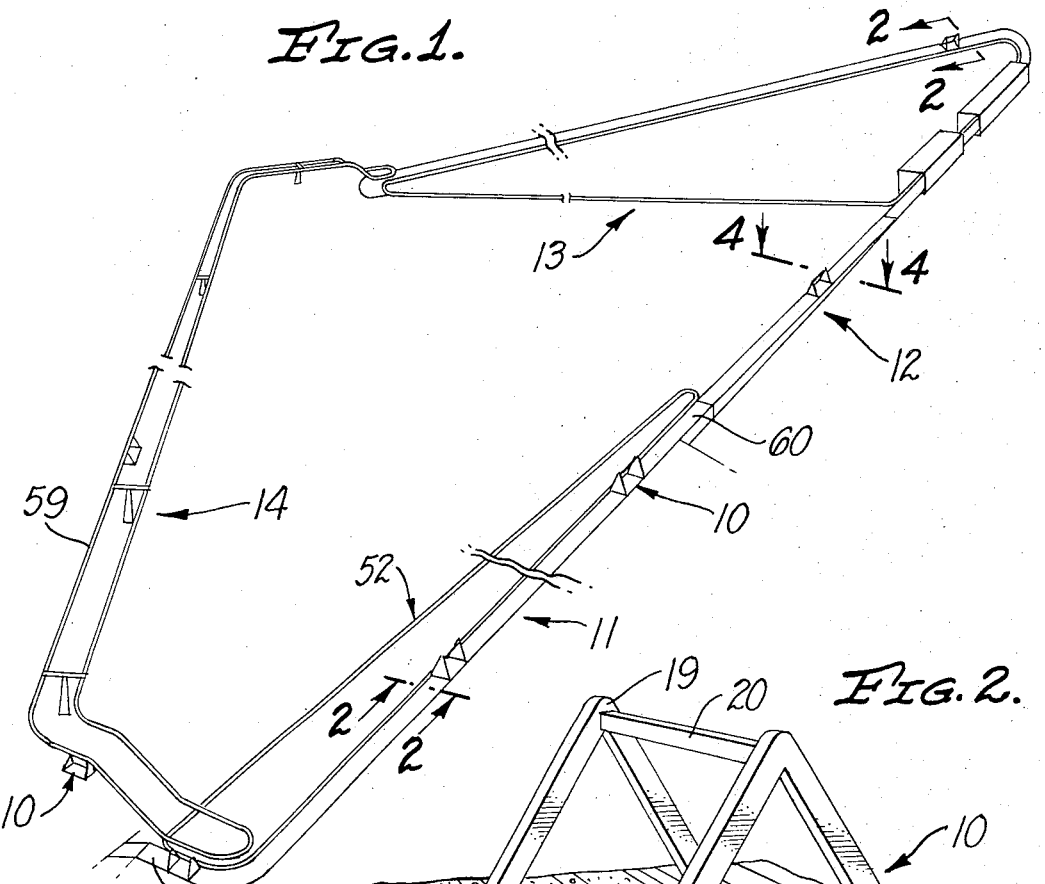
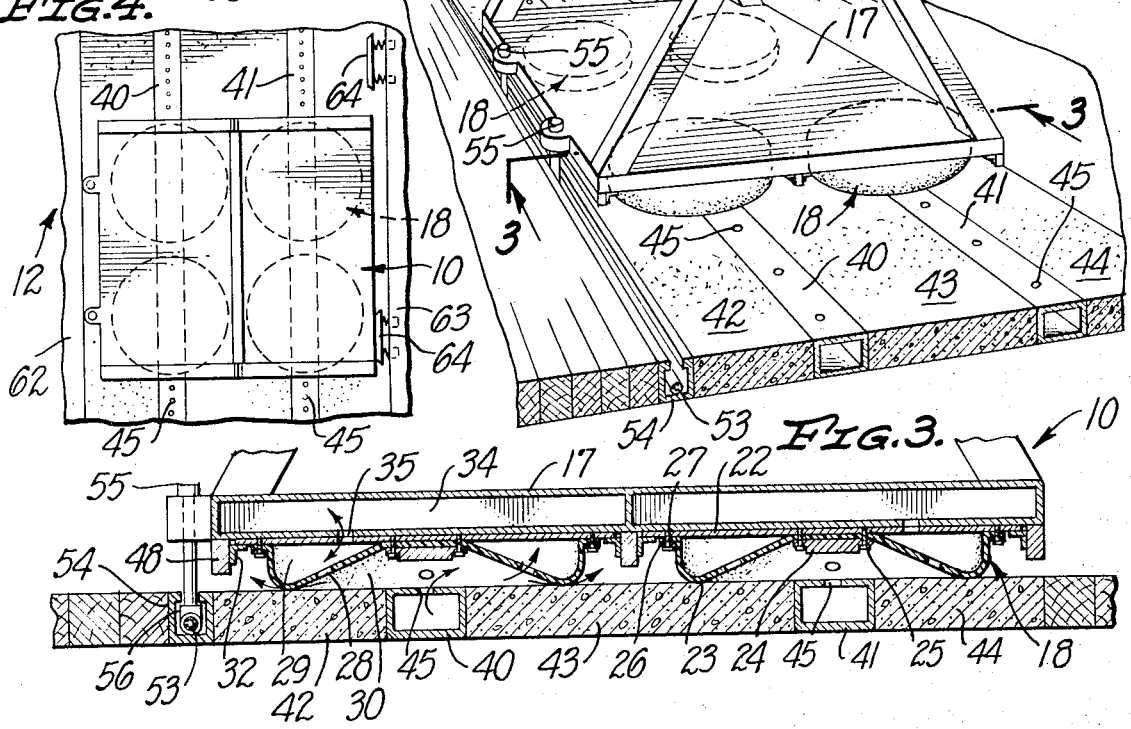

CONVEYOR SYSTEM WITH AIR IN FLOOR

This invention relates to transportation systems using air cushions and in particular, to a new and improved air cushion system with the air bearings on the transporter or load carrying platform and the air supply in the track over which the transporter moves.

A typical transporter comprises a platform or pallet or other load supporting member and a plurality of air bearings carried under the platform. Compressed air is delivered to the air bearings which generate a film of air between the transporter and the ground surface or track, resulting in a very low friction between the transporter and the track. A transporter of this type is shown in the copending application of Robert E. Burdick entitled Replaceable Air Cushion Device, Ser. No. 180,666, filed Sept. 15, 1971, now U.S. Pat. No. 3,756,342.

In the prior art transporters, compressed air is provided for the air bearings by a hose connection from the transporter to a remote supply or by an air compressor carried on the transporter. In the system of the present invention, no hose connection or self-contained compressor is required for each transporter. Rather, the air supply is provided by one or more ducts in the track or floor, the duct having a plurality of openings in the upper wall providing upward air flow into the air bearings of the transporters disposed along the track. Accordingly, it is an object of the present invention to provide a new and improved air cushion conveyor system with self-contained transporters supported on air bearings on a track having the air supply for the air bearings in the track itself. A further object is to provide such a system wherein the transporters can be individually positioned and moved along the track and where the transporters can be joined together for movement in a train. An additional object is to provide such a conveyor system wherein transporter movement can be provided by continuous drive systems and by gravity and by individual drive units, as desired. A particular object of the invention is to provide such a system wherein the track may be prefabricated in standard sections and assembled on the site in various configurations as desired, including open ended configurations and closed loop configurations.

Other objects, advantages, features and results will more fully appear in the course of the following description. The drawings merely show and the description merely describes preferred embodiments of the present invention which are given by way of illustration or example.

In the drawings:

FIG. 1 is a perspective view of an assembly line conveyor system incorporating preferred embodiments of the present invention;

FIG. 2 is an enlarged sectional view taken along the line 2—2 of FIG. 1;

FIG. 3 is an enlarged partial sectional view taken along the line 3—3 of FIG. 2;

FIG. 4 is an enlarged partial plan view taken along the line 4—4 of FIG. 1;

Figure 5:
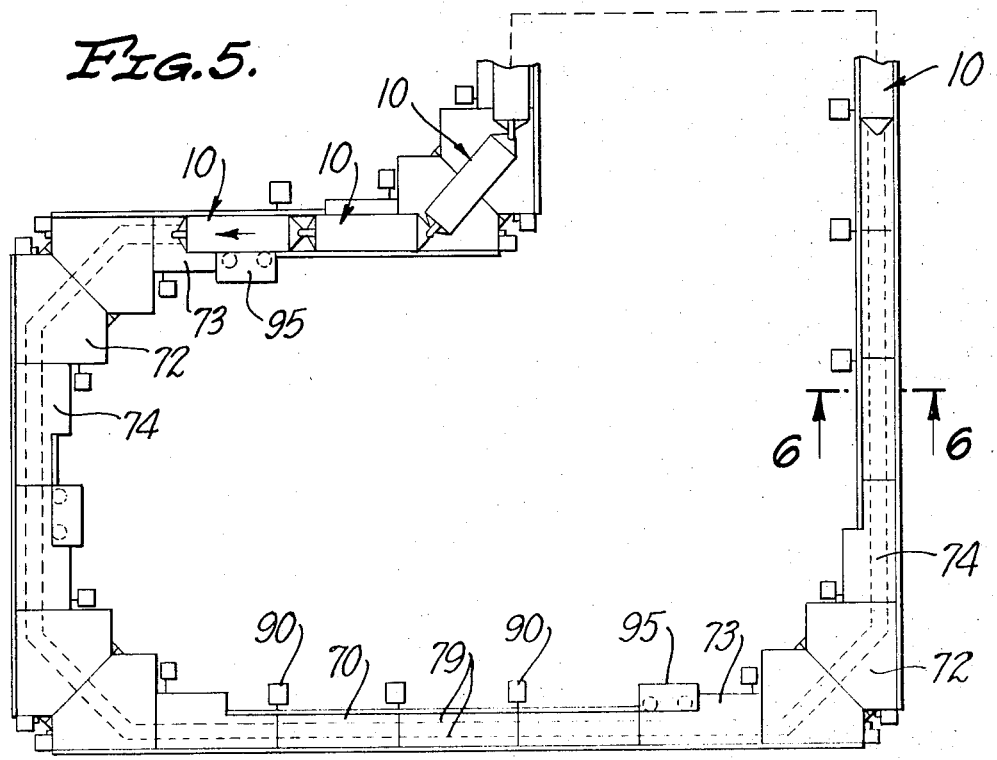
FIG. 5 is a plan view of a conveyor system incorporating an alternative embodiment of the present invention.
Figure 6:
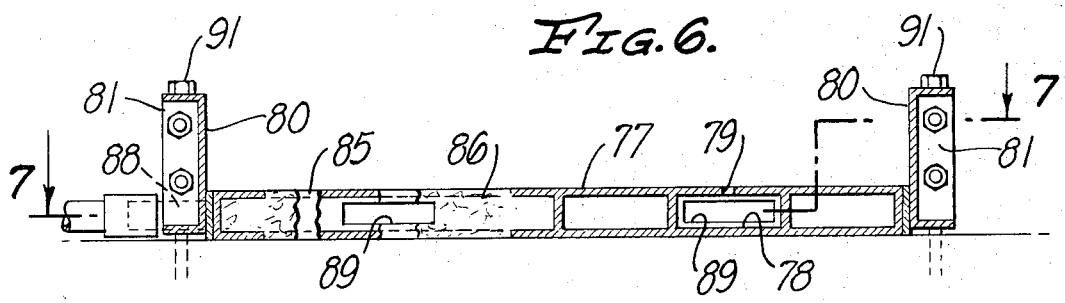
FIG. 6 is an enlarged sectional view taken along the line 6—6 of FIG. 5.
Figure 7:
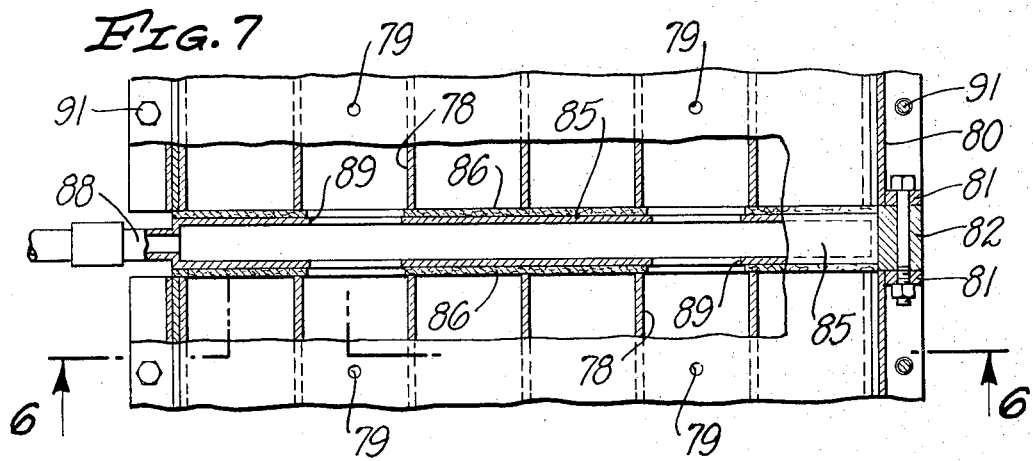
FIG. 7 is a sectional view taken along the line 7—7 of FIG. 6.
Figure 8:
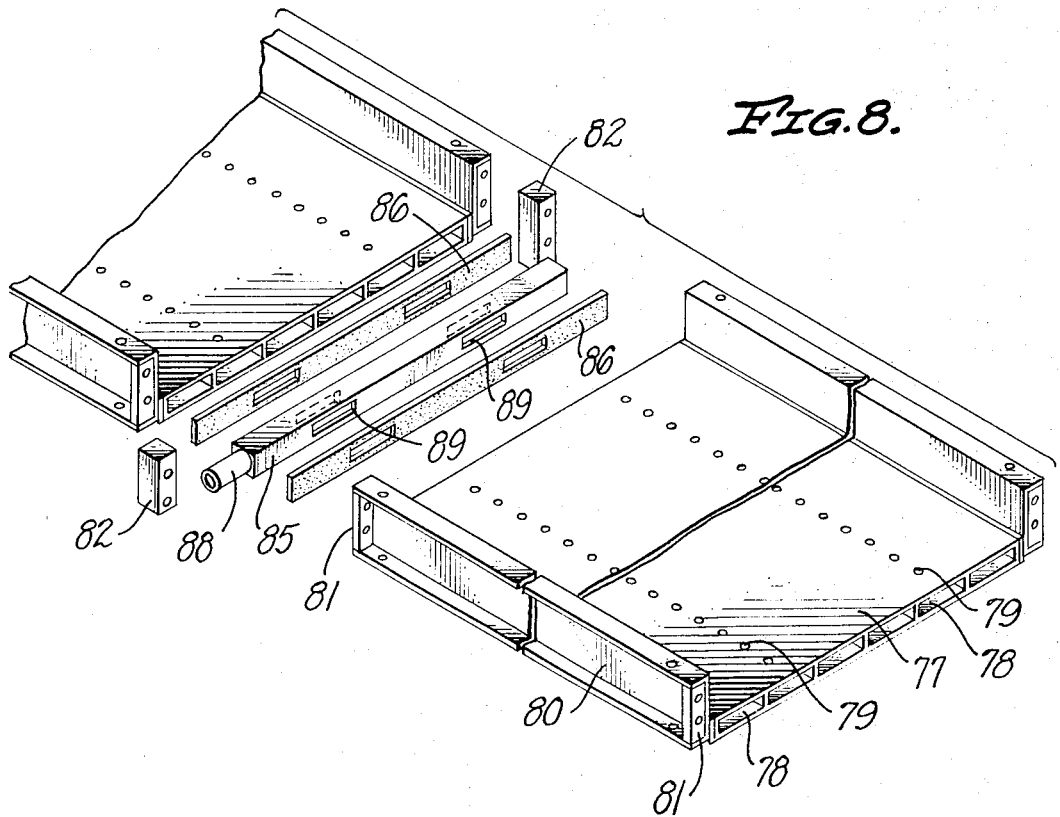
FIG. 8 is an exploded perspective view showing the track joint of FIG. 7.

A plurality of transporters 10 are shown in the assembly line of FIG. 1, with three transporters in the section 11, one transporter in the section 12, one transporter in the section 13, and two transporters in the section 14. Under normal operating conditions, many more transporters would be utilized in each section but these few have been shown in FIG. 1 for purposes of clarity.

A typical transporter comprises a platform 17 and one or more air bearings 18 (FIG. 2). The platform 17 may be a flat plate or may have a wide variety of configurations, depending upon the particular load to be transported. The transporter 10 of FIG. 2 includes an A-frame 19 at each end with a central bar 20 for carrying a suspended load. Four air bearings 18 are carried on the underside of the platform 17 and in the embodiment illustrated, are of the slide out or replaceable type as shown in the aforementioned copending application.

An air bearing 18 includes an upper plate 22 and a lower diaphragm 23, with the diaphragm mounted to the plate at the center by means of a disc 24 and fasteners 25, and at the periphery by means of a ring 26 and fasteners 27. Openings 28 in the diaphragm 23 provide air flow paths between an annular section 29 and a central section 30. The plate 22 of the air bearing 18 slides in grooves formed by the platform 17 and angles 32, permitting insertion and removal of the air bearing. A damping chamber 34 may be provided in the platform 17 for each air bearing, with aligned openings at 35 providing air flow between the air bearing and the damping chamber.

The transporter track for the section 11 is built into the floor of the work area and in the embodiment illustrated, comprises tubular ducts 40, 41 and concrete strips 42, 43, 44. Openings 45 are spaced along the upper wall of the ducts 40, 41 providing upward flow of air from the ducts into the air bearings of the transporters positioned along the track. Air flows from a duct into the central space 30 of an air bearing and through the openings 28 into the annular space 29. Air flows back and forth between the damping chamber 34 and the annular space 29 for damping surges in the air supply. When air bearings are uninflated, the transporter will rest on its skids 48. When air under pressure is provided to the air bearings, the bearing is inflated to the condition of FIG. 3 and the transporter is raised from the track. Air also flows from the central space 30 outward between the track surface and the diaphragm to provide a thin film of air between the transporter and the ground, providing the desired low friction condition. When the air bearings are inflated, the transporter is readily moved along the ground and, in most installations, some form of guide is utilized to direct the transporter movement along the desired path. A transporter may be manually pushed, may move along an inclined path under the influence of gravity and may be driven by some form of drive mechanism, as desired.

In section 11 of the assembly line of FIG. 1, the transporters are guided and driven by a drag line 52 which may include a cable 53 running in a channel 54 in the floor adjacent the concrete strip 42. The cable 53 is moved in a continuous loop by a drive motor not shown. Towing pins 55 on each transporter 10 are engageable with towing lugs 56 on the cable 53 for engaging and disengaging a transporter with the drag line. The towing pins may slide vertically relative to the platform of the transporter, permitting vertical movement of the transporter on the track without affecting the coupling to the drag line. The configuration illustrated in FIGS. 2 and 3 provides for movement of a transporter along the track and maintains the air bearings in position over the air ducts.

In operation, transporters are delivered to the start end 58 of the section 11 by an overhead conveyor line 59 above the section 14. The transporter is coupled to the drag line 52 and is moved along the section 11 to the finish end 60, where the towing pins are disengaged from the cable. The uncoupled transporter is then pushed onto the next section 12, which in the embodiment illustrated is slightly inclined downward to the section 13.

In the section 12, upstanding walls or curbs 62, 63 are provided on opposite sides of the track for guiding the transporters along the track. Continuous movement of a transporter along the track under the influence of gravity may be restrained by suitable means such as spring-loaded snubbers 64 positioned at intervals along the track. In use of the section 12, the transporters may be permitted to move along the section under the influence of gravity at an uncontrolled rate, or the rate may be controlled by snubbers and the like, or the movement may be controlled by the assembly line operators with mechanically movable stops or the like. In an alternative configuration, the track section 11 can be horizontal and the operators will manually move the transporters as desired.

In the embodiment of FIG. 1, the track section 13 is similar to the track section 11, with the transporters being moved by a drag line and with the transporters at the finish end being unloaded and mounted on the overhead conveyor 59 for return to the section 11.

Figure 9:
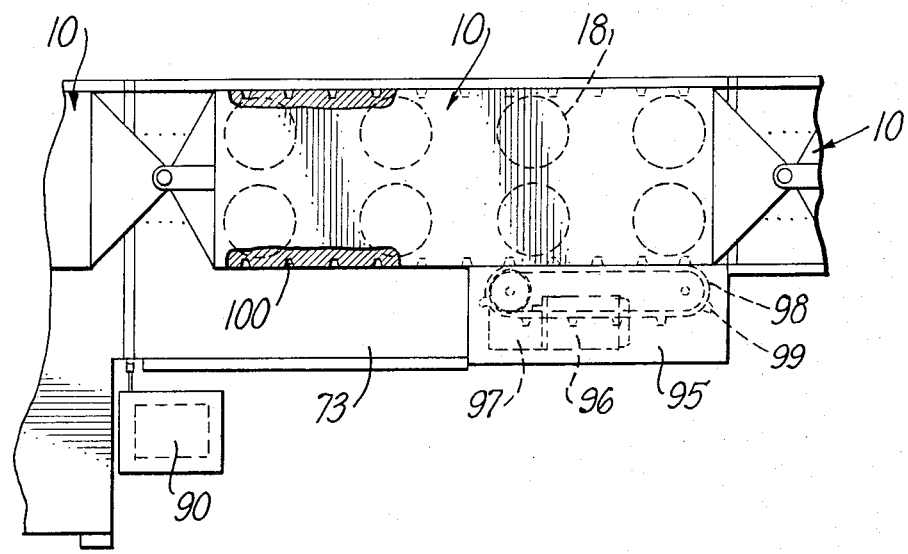
FIG. 9 is an enlarged view of a portion of the plan view of FIG. 5, illustrating a drive system.

In the embodiment of FIGS. 5-9, track sections are prefabricated and assembled on the site to provide any desired path for the transporters, either open ended or closed loop, and a typical closed loop is indicated in FIG. 5. The loop of FIG. 5 includes straight sections 70, 45° curve sections 71, 72, precurve drive sections 73 and postcurve sections 74. All of these prefabricated track sections are generally the same in design and construction, and straight sections 70 are shown in greater detail in FIGS. 6-8 and a drive section 73 is shown in FIG. 9.

A typical straight track section 70 includes a deck 77 formed of a plurality of rectangular tubes 78 welded together, with one or more of the tubes serving as air ducts. Openings 79 in the top walls of the air ducts provide the air supply to the air bearings of the transporters which move along the track sections. A side wall or curb is provided at each edge of the track section by a channel 80 welded to the deck 77. A track section may be joined to an adjacent track section by bolting through end plates 81 in the channels 80 and spacer blocks 82. An air supply conduit 85 may be positioned between the decks 77 of adjacent track sections, preferably with gaskets 86, to provide air to the ducts in the track sections. The conduit 85 has an inlet 88 for connection to an air supply and transverse openings 89 to provide an air flow path into the ducts in the track sections. An individual air compressor 90 may be provided for each track section or the conduits may be connected to a common supply, as desired. The track sections may be held in position on the floor of the work area by anchor bolts 91 positioned in aligned openings in the channels 80.

Transporters, such as the transporter 10 of FIG. 2, may be utilized with the prefabricated track sections and may be moved along the track individually by manual pushing or by moving down a slope or by other drive means as desired. In one configuration illustrated in FIG. 5, a plurality of the transporters 10 are connected end to end to form a train, with some of the track sections, namely section 73, incorporating drive units for moving the train along the track. The track may be open ended, with transporters returned from the finish to the start by other means such as the overhead conveyor 59 of FIG. 1. Alternatively the track may be a closed loop with the transporters continuously moving along the track. In one embodiment, the transporters occupy the entire track and are connected in a closed loop.

The drive section 73 of FIG. 9 includes a drive unit 95 having a drive motor 96, a gear reduction 97 and an endless belt 98 having lugs 99 for engaging corresponding openings 100 in the sides of the transporters. The motor 29 of each of the drive units is operated whenever it is desired to move the train of transporters. In an alternative drive, a high friction, compliant material (such as flexible urethane foam) is attached to the belt 98 to engage the side of the transporter and pull it along the track, with rollers provided at the opposite curbs engaging the other side of the transporter.

While exemplary embodiments of the invention have been disclosed and discussed, it will be understood that other applications of the invention are possible and that the embodiments disclosed may be subjected to various changes, modifications and substitutions without necessarily departing from the spirit of the invention.

What is claimed is:

1. In an air cushion conveyor system, the combination of:
   a transporter having an air bearing, said air bearing including an upper plate and a lower diaphragm attached to said plate at the center and at the periphery defining an annular space and a central space, with at least one opening in said diaphragm providing a flow path between said spaces;
   track means having an upper surface for said transporter and including an air duct substantially flush with said upper surface and having a plurality of spaced openings in the upper wall thereof providing a plurality of continuously open upwardly directed flow passages along said duct for supplying air to an air bearing positioned on said track means; and
   interengaging means on said transporter and track means for guiding said transporter as it moves along said track means to position said bearing over said duct.

2. A system as defined in claim 1 wherein said transporter includes:
   a plurality of said air bearings in side-by-side relation;

means defining a plurality of air chambers in said transporter with an air chamber for each air bearing; and means defining another flow path between the annular space of each air bearing and a corresponding air chamber; and said track means includes a pair of said air ducts disposed parallel to each other providing separate air supplies for said side-by-side bearings.

3. A system as defined in claim 1 wherein said track means is the floor of the work area and said duct is in the floor with the duct upper surface substantially flush with the floor.

4. A system as defined in claim 1 wherein said track means comprises a plurality of separate track sections connected end to end, each of said track sections having a central deck and upstanding side walls defining a channel for a transporter, with said duct disposed in said deck, and an air supply unit at the junction of two track sections, said unit including an upper surface flush with the deck, a lateral conduit, a transverse opening providing an air path between said conduit and a track duct, and means for connecting an air supply to said lateral conduit.

5. A system as defined in claim 4 wherein said plurality of track sections are connected in a closed loop, and including a plurality of said transporters connected end to end to form a closed loop train, and drive means for moving said train along said track means.

6. A system as defined in claim 1 wherein said track means has a start end and a finish end; and including a conveyor line positioned between said ends and having means for carrying a transporter from said finish end to said start end.

7. A system as defined in claim 1 including a plurality of said transporters connected end to end to form a train, and transporter drive means mounted at said track means in driving relation with a transporter for moving said train along said track means.

8. A system as defined in claim 7 wherein said track means is a closed loop.

9. In an air cushion conveyor system, the combination of:

a transporter having an air bearing, said air bearing including an upper plate and a lower diaphragm attached to said plate at the center and at the periphery defining an annular space and a central space, with at least one opening in said diaphragm providing a flow path between said spaces;

track means for said transporter and including an air duct having a plurality of spaced openings in the upper wall thereof providing a plurality of upwardly directed flow passages along said duct for supplying air to an air bearing positioned on said track means, with said track means inclined along the axis of said duct for gravitational movement of a transporter; and interengaging means on said transporter and track means for guiding said transporter as it moves along said track means to position said bearing over said duct, said interengaging means including snubber means for controlling the velocity of a transporter along said track means.

* * * * *